US007959486B1

(12) United States Patent
Lee

(10) Patent No.: US 7,959,486 B1
(45) Date of Patent: Jun. 14, 2011

(54) NATIVE BEE PROPAGATION POLE AND METHOD OF USE

(76) Inventor: Chester R. Lee, Erie, PA (US)

( * ) Notice: Subject to any disclaimer, the term of this patent is extended or adjusted under 35 U.S.C. 154(b) by 173 days.

(21) Appl. No.: 12/378,251

(22) Filed: Feb. 11, 2009

(51) Int. Cl.
*A01K 47/00* (2006.01)

(52) U.S. Cl. ................................................ 449/1; 449/4

(58) Field of Classification Search .................. 449/1, 4; 174/45 R; 119/428, 433; 116/22 A; 52/697; 405/231; 47/1.1
See application file for complete search history.

(56) References Cited

U.S. PATENT DOCUMENTS 947,929 A * 2/1910 Nelson ............................. 256/1
964,737 A * 7/1910 Ashley ...................... 174/137 R
1,485,629 A * 3/1924 Seeger ......................... 403/262
2,425,265 A * 8/1947 Pittman ...................... 174/45 R
3,319,328 A * 5/1967 Finger et al. .................... 29/423
3,428,283 A * 2/1969 Dake ............................. 248/214
4,918,859 A * 4/1990 Shevlin ............................ 47/1.1

* cited by examiner

*Primary Examiner* — Rob Swiatek
(74) *Attorney, Agent, or Firm* — Richard K Thomson

(57) ABSTRACT

A standing length of untreated deadwood timber, having a 2"-6" diameter and an above ground length of between 3' and 9', has a flattened face with sets of different diameter holes drilled therein. Colorful ribbons, in addition to the aroma of the decaying deadwood, attract multiple species of native solitary bees to the bee pole to use the holes to lay eggs therein. The pole is planted 1.5 to 2' in soil adjacent fields, gardens or orchards which need pollination.

10 Claims, 1 Drawing Sheet

30a 30b 30c 30d 30e 30f 30g 22 20 26 40a 40b 40c 40d 24

NATIVE BEE PROPAGATION POLE AND METHOD OF USE

BACKGROUND AND SUMMARY OF THE INVENTION

Various species of bees are responsible for 90% of all pollination of flora. It is a widely publicized fact that the North American "colony or honey" bee population has experienced a dramatic decrease in the past several years. While the actual cause is still under investigation (and may prove to be a result of a virus spread by aphids living within the hive), the result is no mystery. Crops which rely upon bees for pollination, including most fruits, vegetable, food and textile crops, are in jeopardy of drastically reduced yields.

While finding a cure to restore/repopulate the honey bee hives may take years, an immediate cure to the loss of pollinators is readily available with the implementation of the present invention. There are 97 species of native solitary bees, some of which are yet to be catalogued, indigenous to North America. Just some of the species of solitary bees include carpenter bees, leaf cutting bees, giant resin bees, mason bees, and squash bees, to name a few. On the whole, the solitary bees are far more efficient pollinators than honey bees and, hence, an orchard or field can be readily pollinated by a much smaller number of bees than would be required if only honey bees were available. However, these native bees tend to be far more localized in their flight patterns, remaining within a few hundred yards of the hatching place. Accordingly, it is incumbent upon the horticulturalist to foster hatching of these bees in the vicinity of her/his field, garden, or orchard.

Some native bees seek habitat in standing deadwood and are actually drawn to deadwood timber by the scent of the $CO_2$ which its decomposing fibers exude. Some of the prior patents have attempted to formulate bee habitats from treated wood and/or paper or non-wood materials. Native bees will not, typically be attracted to such habitats and, hence, efforts to foster propagation of native bees using these manmade materials have proven to be largely ineffective. A queen bee will typically lay between 60 and 60,000 eggs during her three year life span. The queen will typically find a hole of suitable depth formed in a standing dead tree which has been pecked by woodpecker or other bird. She lays a single egg in the cavity and covers it over. The bee will hatch, typically in about 20 days.

In addition to being attracted to standing deadwood, native bees are attracted by brightly colored objects, normally in connection with their pursuit of nectar, but the present invention proposes to lure the native bees to the bee propagation pole by decorating the pole with four ribbons, one each of the primary colors, blue, red and yellow and including white.

Solitary bees, having no hive or territory to protect, are not prone to the aggressive behavior of honey bees nor are they capable of the multiple stings for which some bees/wasps are known. Different species of bees seek out/prefer different sized holes in the standing deadwood and, accordingly, the bee propagation pole of the present invention offers a variety of (seven or more) diameter habitats. Native bees will start working in weather which is up to 5° colder than honey bees will, and will work in overcast conditions and high humidity, honey bees being often discouraged by such weather conditions. An additional benefit is that the presence of native bees in the honey bees' collection zone cause them to work, up to five times as hard in seeking nectar and, hence, in pollinating the plants. Certain species of bees even hatch out in late winter and are therefore, available to begin pollination of the earliest of spring crops.

The bee propagation pole of the present invention comprises a) a length of untreated deadwood timber having a flattened face on a portion of that length; b) a first group of holes having a first diameter to foster propagation of a first type of solitary bee; c) at least one additional group of holes having a second larger diameter to foster propagation of a second type of solitary bee. The length of untreated deadwood timber may have an above ground length falling in a range of between 3 and 9 feet and a diameter of between 2" and 6". All but one of the first group of holes is drilled to a uniform first depth, with that one first hole being drilled deeper to foster growth of a queen bee of the first type of solitary bee. Hole depth of 0.5" will produce a worker bee and a depth of 0.75" will result in a queen bee. Similarly, all but one of the second group of holes is drilled to a uniform second depth, with the one second hole being drilled deeper to foster growth of a queen bee of the second type of solitary bee. Preferably, a plurality of ribbons are suspended from the bee pole, the ribbons having colors designed to attract solitary bees, the plurality most preferably including at least four, one of each of the primary colors red, blue and yellow and white.

Another facet of the present invention comprises a method of fostering the propagation of native solitary bees including the steps of a) fashioning a length of deadwood timber by shaving at least a portion of that length to form a flat face, drilling multiple pluralities of different diameter holes in the flat face; b) affixing a plurality of different colored ribbons to a portion of the length; c) inserting a bottom portion of the length into a piece of ground adjacent a field, garden or orchard to be pollinated, to a depth between 1.5 and 2 feet with the flat face turned in a east south easterly direction to greet a rising sun.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
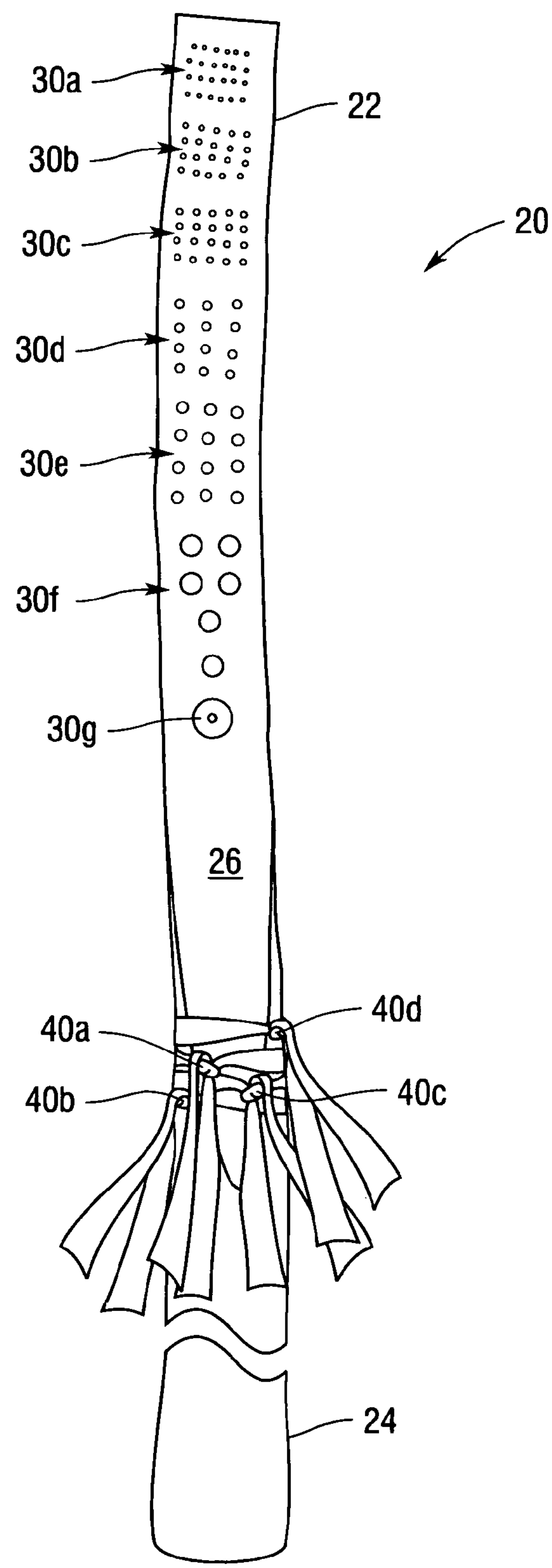
FIG. 1 is a perspective front view of a first embodiment of the bee propagation pole of the present invention.

A first embodiment of the bee propagation pole of the present invention is depicted in FIG. 1 generally at 20. Bee propagation pole 20 comprises a length of untreated standing deadwood timber preferably harvested from a region having weather which similar to that where the propagation is to take place. The deadwood timber will preferably be selected from 2" to 6" in diameter and its length will typically be trimmed to a 3' to 9' above ground range. An upper region 22 of bee pole 20 is shaved to provide a flat face 26. Pluralities of sets of holes 30*a*, 30*b*, 30*c*, 30*d*, 30*e*, 30*f* and a solitary large diameter hole 30*g* afford propagation habitat for upwards of 8 different species of native solitary bees. Diameters of holes 30 begin at 0.060" and go up to 0.750", each diameter of hole attracting a different group of species of bees. Typically, each set of holes will be drilled to a uniform depth of 0.5" with the exception of one hole being drilled to a depth of 0.75". This deeper hole will result in the growth of a queen bee who will supplant the existing queen as egg layer at the end of her 3 year lifespan. While some of the prior patents propose cleaning out the egg cavities to remove unhatched bee eggs, such treatment of the present bee propagation pole 20 is not recommended. Such treatment/cleansing agents can be harmful to some species of bees. In addition, certain species of wasps and many species of spiders will effect the desired house cleaning function without the need to possibly contaminate the habitat.

A typical bee propagation pole 20 will include 3 ⅜" holes at the top, 25 3/32" holes, 25 ⅛" holes, 25 5/8" holes, 20 7/32" holes, 20 ¼" holes, 4 11/32" holes and 3 7/16" holes. These 8 different diameters will appeal to more than 8 different species of bees, several species preferring the same diameter holes. Should the overall length of the pole 20 be, for example, 70", the upper 35" will have a flattened face 26 with the upper 20" will have holes therein and the remainder of the flattened region is reserved for indicia regarding the name and origin of pole 20.

It is known that native bees are attracted to brightly colored flowers and plants. It is part of God's way of accomplishing the pollination project. Accordingly, one feature of the present invention is to attach brightly colored ribbons 40*a*, 40*b*, 40*c* to upper region 22, one for each of the primary colors: blue, red and yellow along with white. The combination of the exuded CO2 gas from the decomposing timber and the brightly colored ribbons 40 will attract the native bees to their propagation habitat.

In use, the bottom region 24 of bee propagation pole 20 should be planted in soil adjacent a field, garden or orchard to be pollinated with 1.5 to 2 feet of the pole 20 beneath the ground's surface to provide adequate stability against movement by wind and weather. Flattened face 26 should be turned to face east southeast toward the rising sun and will be warmed by the rays of the sun throughout the day to facilitate hatching of the eggs.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A native been propagation pole comprising:

a) a length of standing untreated deadwood timber having a flattened face on a portion of said length extending along said length artificially created by removing material from one side of said deadwood timber;

b) a first set of blind holes formed by drilling individual, non-intersecting holes in said flattened face said first set of holes having a first diameter to foster propagation of a first type of solitary bee;

c) at least one additional set of blind holes formed in by drilling individual, non-intersecting holes said flattened face, said at least one additional set of holes having a second larger diameter to foster propagation of a second type of solitary bee.

2. The native bee propagation pole of claim 1 wherein said length of untreated deadwood timber has an above ground length falling in a range of between 3 and 9 feet and a diameter of between 2" and 6".

3. The native bee propagation pole of claim 1 wherein all but one of said first set of holes is drilled to a uniform first depth, with one of said first holes being drilled deeper to foster growth of a queen bee of said first type of solitary bee.

4. The native bee propagation pole of claim 1 wherein all but one of said at least one additional set of holes is drilled to a uniform second depth, with one of said additional holes being drilled deeper to foster growth of a queen bee of said second type of solitary bee.

5. The native been propagation pole of claim 1 further comprising a plurality of ribbons suspended from said length of deadwood timber, said ribbons having colors designed to attract solitary bees.

6. The native bee propagation pole of claim 5 wherein said plurality of ribbons includes at least four, one of each of a group of primary colors: red, blue and yellow and white.

7. The native bee propagation pole of claim 1 wherein a plurality of sets of different sized holes in said length of standing deadwood timber can afford upwards of seven different species of solitary bees a propagation habitat.

8. A method of fostering the propagation of native solitary bees said method comprising the steps of a) artificially fashioning a length of untreated deadwood timber by shaving at least a portion of said length to form a flat face, drilling multiple pluralities of different diameter holes in said flat face;

b) inserting a bottom portion of said length into a piece of ground adjacent a field, garden or orchard to be pollinated to a depth adequate to ensure that said untreated deadwood stands.

9. The method of claim 8 further including the step of affixing a plurality of different colored ribbons to a portion of said length.

10. The method of claim 8 further comprising the additional step of turning said flat face in a east-southeasterly direction to greet a rising sun.

* * * * *